(12) United States Patent
Edelmann et al.

(10) Patent No.: US 9,494,054 B2
(45) Date of Patent: Nov. 15, 2016

(54) AUXILIARY STEAM GENERATOR SYSTEM FOR A POWER PLANT

(71) Applicant: SIEMENS AKTIENGESELLSCHAFT, München (DE)

(72) Inventors: Heiner Edelmann, Weisendorf (DE); Mark Reissig, Rückersdorf (DE); Marc Sattelberger, Nürnberg (DE); Andre Schrief, Erlangen (DE)

(73) Assignee: SIEMENS AKTIENGESELLSCHAFT (DE)

( * ) Notice: Subject to any disclaimer, the term of this patent is extended or adjusted under 35 U.S.C. 154(b) by 164 days.

(21) Appl. No.: 14/372,223

(22) PCT Filed: Dec. 4, 2012

(86) PCT No.: PCT/EP2012/074333
§ 371 (c)(1),
(2) Date: Jul. 15, 2014

(87) PCT Pub. No.: WO2013/107557
PCT Pub. Date: Jul. 25, 2013

(65) Prior Publication Data
US 2015/0000276 A1    Jan. 1, 2015

(30) Foreign Application Priority Data

Jan. 19, 2012  (DE) ........................ 10 2012 200 741

(51) Int. Cl.
*F01K 23/06* (2006.01)
*F01K 13/00* (2006.01)
(Continued)

(52) U.S. Cl.
CPC .............. *F01K 13/006* (2013.01); *F01K 3/16* (2013.01); *F01K 7/16* (2013.01); *F01K 9/00* (2013.01); *F03G 6/003* (2013.01); *F22D 3/00* (2013.01); *F22D 11/02* (2013.01); *Y02E 10/46* (2013.01)

(58) Field of Classification Search
USPC .................................................. 60/643–381
See application file for complete search history.

(56) References Cited

U.S. PATENT DOCUMENTS 3,338,055 A * 8/1967 Gorzegno ................. F01K 3/22
122/406.1
3,769,795 A * 11/1973 Rostrom ............... F01K 23/108
122/401

(Continued)

FOREIGN PATENT DOCUMENTS

CN 101749961 A 6/2010
CN 201574161 U 9/2010

(Continued)

OTHER PUBLICATIONS

International Search Report; PCT/EP2012/074333; International File Date: Dec. 4, 2012; 3 pgs.

(Continued)

*Primary Examiner* — Jesse Bogue
(74) *Attorney, Agent, or Firm* — Schmeiser Olsen & Watts LLP

(57) ABSTRACT

An auxiliary steam generator system for a power plant, comprising a water-steam circuit, which has a condensate line and a feed-water line, wherein a condensate pump is connected in the condensate line and a feed-water pump is connected in the feed-water line, and wherein a pressure accumulating vessel is connected between the condensate pump and the feed-water pump, and wherein a feed-water take-off line is connected to the water-steam circuit at a branch-off point after the pressure accumulating vessel is provided. The feed-water take-off line is connected to the pressure accumulating vessel and a heating device is connected in the feed-water take-off line.

16 Claims, 2 Drawing Sheets

(51) Int. Cl.
*F22D 3/00* (2006.01)
*F22D 11/02* (2006.01)
*F01K 3/16* (2006.01)
*F01K 7/16* (2006.01)
*F01K 9/00* (2006.01)
*F03G 6/00* (2006.01)

(56) References Cited

U.S. PATENT DOCUMENTS

| | | | | |
|---|---|---|---|---|
| 3,774,579 | A * | 11/1973 | Sakai | F22D 11/02 122/1 C |
| 4,207,842 | A | 6/1980 | Kehlhofer | |
| 4,311,013 | A * | 1/1982 | Kuribayashi | B01D 5/0051 122/406.5 |
| 4,438,630 | A | 3/1984 | Rowe | |
| 4,465,027 | A * | 8/1984 | Steinegger | B01D 19/0068 122/406.4 |
| 4,555,906 | A | 12/1985 | Myers | |
| 4,896,500 | A | 1/1990 | Pavel et al. | |
| 6,223,536 | B1 | 5/2001 | Liebig | |
| 2005/0235625 | A1 | 10/2005 | Kuzmanovski | |
| 2010/0175365 | A1 * | 7/2010 | Ota | F01K 23/10 60/39.181 |
| 2010/0199671 | A1 * | 8/2010 | Bellows | F01K 9/00 60/657 |
| 2010/0257860 | A1 * | 10/2010 | Feller | F01K 13/006 60/646 |

FOREIGN PATENT DOCUMENTS

| | | |
|---|---|---|
| DE | 2609622 A1 | 9/1977 |
| DE | 2620023 A1 | 11/1977 |
| DE | 2907068 A1 | 11/1979 |
| DE | 3137371 A1 | 4/1983 |
| DE | 4432960 C1 | 11/1995 |
| JP | S548204 A | 1/1979 |
| JP | H03206305 A | 9/1991 |
| JP | H04127871 A | 4/1992 |
| JP | H05285366 A | 11/1993 |
| JP | 2002267102 A | 9/2002 |
| SU | 1089292 A1 | 4/1984 |
| WO | WO 2010149614 A2 | 12/2010 |

OTHER PUBLICATIONS

Japanese Office Action translation for Application No. 2014-552537, mailed on Aug. 25, 2015.

* cited by examiner

AUXILIARY STEAM GENERATOR SYSTEM FOR A POWER PLANT

CROSS-REFERENCE TO RELATED APPLICATIONS

This application claims priority to PCT Application No. PCT/EP2012/074333, having a filing date of Dec. 4, 2012, based off of DE 102012200741.5 having a filing date of Jan. 19, 2012, the entire contents of which are hereby incorporated by reference.

FIELD OF TECHNOLOGY

For additional processes, especially starting modes or operating states, conventional power plants with a water-steam cycle require additional steam which possibly cannot be provided by means of the actual steam generation process. Counted among these specific operating states are especially transient operating states, operational outages, partial load operation or starting up and shutting down processes. Auxiliary steam is therefore required for example during an operational outage for maintaining pressure or for maintaining heat in the feed-water tank and also for gland steam supply to the steam turbine. The steam that can be generated by means of the actual steam generation process in this case may possibly not be sufficient, or not totally sufficient, for maintaining the pressure in the feed-water tank or for the operation of other auxiliary systems of the power plant.

BACKGROUND

In order to counter this problem, additional auxiliary steam generators are integrated into the water-steam cycle of the conventional power plant according to the prior art. These auxiliary steam generators are fossil-fired boilers or so-called auxiliary steam boilers. In most cases they are operated with gas or oil, or with other fossil fuels.

Such auxiliary steam generators represent a high investment in the construction of power plants, especially as a result of the costly and complex connecting of the auxiliary steam generator into the water-steam cycle and to the auxiliary steam systems. As a result of the complex connections, the auxiliary steam generators have a large space requirement. Moreover, they require additional expenditure approval during construction. Since the auxiliary steam generators are provided especially for specific operations, they are not required during normal operation of the power plant, but, however, give rise to running costs or efficiency losses since they have to be kept hot electrically, or via steam from the water-steam cycle of the power plant. They also give rise to regular and not insignificant maintenance costs.

SUMMARY

An aspect relates to an auxiliary steam generator system as a result of which the disadvantages from the prior art are avoided, and, above all, the installation costs can be drastically reduced. Moreover, it is the object of the invention to disclose a method for auxiliary steam generation, as a result of which the disadvantages from the prior art are avoided.

The aspect which is directed towards the provision of an auxiliary steam generator system is achieved by means of the features as set forth in the embodiments of the invention.

The proposal is for an auxiliary steam generator system for a power plant, which comprises a water-steam cycle with a condensate line, wherein a condensate pump is connected into the condensate line and a feed-water pump is connected into the feed-water line. Furthermore, a pressure accumulating vessel is connected into the lines between the condensate pump and the feed-water pump, and a feed-water extraction line is connected at a branch point to the water-steam cycle downstream of the pressure accumulating vessel. The feed-water extraction line is now connected to the pressure accumulating vessel, and a heating device is connected into the feed-water extraction line.

The feed-water tank of the power plant is provided as the pressure accumulating vessel and therefore now fulfills the function of storing condensate or feed water for the water-steam cycle, and, moreover, of supplying steam or saturated steam for the supply of auxiliary steam to the power plant. To this end, the heating device is designed so that the feed water is able to be heated by means of this so that after a corresponding pressure reduction steam can be generated in the pressure accumulating vessel.

The achieved effect is that the feed-water tank or pressure accumulating vessel can be held at a necessary pressure or at a corresponding temperature even in specific operating states without sufficient process steam, without an additional auxiliary steam generator being necessary. As a result of this, the feed-water tank is used as a thermal accumulator ("Ruths tank"). To this end, the feed-water tank is designed to be larger when necessary, corresponding to the increased demands, than without the function of an additional pressure accumulator.

The auxiliary steam generation in a power plant can be realized in a significantly less complex manner since an additional steam accumulator and fossil-fired auxiliary steam generator can be dispensed with. Consequently, on the one hand advantages accrue as a result of a lower space requirement for the auxiliary systems. On the other hand, energy consumption is also reduced. A conventional auxiliary boiler has to be kept hot electrically or via steam and also has high outage losses. Since the feed-water tank is now used as an energy accumulator, moreover, the feed-water tank is therefore hot anyway. Consequently, additional systems and lines for heat retention can be dispensed with. Since the complexity decreases, the maintenance costs are also reduced, and the availability is greatly increased.

The steam which is stored in the pressure accumulating vessel can also be advantageously used for the supply of auxiliary steam consumers. To this end, the power plant comprises additional auxiliary steam consumers, wherein the pressure accumulating vessel is connected via a steam line to the auxiliary steam consumers.

For this purpose, the steam parameters in the pressure accumulating vessel, such as steam pressure and steam temperature, are correspondingly adjusted to the auxiliary steam consumers which are to be supplied. The adjustment is carried out by means of heating, condensate replenishment or by means of a feed-water pump and/or throttle valves. In an advantageous further development of the auxiliary steam generator system, a pressure maintaining valve is connected into the feed-water extraction line between the heating device and the pressure accumulating vessel, and by means of which the pressure between the heating device and the pressure maintaining valve is increased to such an extent that a sufficiently large margin exists between the operating pressure and the steam pressure of the medium at the respective operating temperature.

In an embodiment of the auxiliary steam generator system, the feed-water extraction line is connected to the condensate line of the water-steam cycle, and a circulating pump is connected into the feed-water extraction line upstream of the heating device. By means of the circulating pump, the steam parameters can be indirectly adjusted by means of the throughput, the heating and in correspondence to the position of the pressure reducing valve. Depending on the design of the power plant, it can be advantageous, moreover, if the feed-water extraction line is connected to an extraction point of the feed-water pump or downstream of the feed-water pump. To this end, specially configured feed-water pumps are required.

In an embodiment of the auxiliary steam generator system, the heating device is electric. The installation costs of a power plant can be reduced since by the use of an electrically heated heating device for the auxiliary steam generator otherwise complex and expensive auxiliary steam generators can be dispensed with. If the described embodiment(s) are used in a solar power plant, by the use of an electric heating device a completely "regenerative power generation" can be realized. Since the electrically heated heating device is free of emissions when in operation, a lower cost approval for solar power plants can be expected. By dispensing with fossil-fired auxiliary steam generation, there is no requirement for a fuel system for storage and distribution of the fuel.

The auxiliary steam generator system is advantageously used in a gas and steam turbine power plant. However, the advantages of the auxiliary steam generator system can also be utilized in other fossil-fired steam power plants. The auxiliary steam generator system is particularly advantageously also used in a CSP (Concentrating Solar Power) steam power plant with solar heated steam generation.

The method for auxiliary steam generation in a power plant process in this case provides an accumulator which is connected into a water-steam cycle and into which condensate from the water-steam cycle is delivered. The condensate is stored, mixed and degassed in the accumulator, and then discharged from the accumulator as feed water, and a partial flow of the discharged feed water is extracted. The partial flow is now heated in a heating process and fed back again into the accumulator.

The accumulator corresponds to a collecting tank for feed water, in which a volume of fluid for the water-steam cycle can be intermediately stored. The collecting tank consequently also serves as a buffer for the feed water.

The partial flow is heated to temperatures which with a sufficient margin are below the boiling point or above the boiling point. By returning the heated partial flow to the accumulator, the pressure in the accumulator is increased. As a result, the accumulator can be additionally used as a pressure accumulator for process steam.

Since because of this an additional pressure accumulator for process steam and an otherwise complex and expensive auxiliary steam generator can be dispensed with, as a result of the method according to the invention especially the installation costs of a power plant process can be lowered. As a result of the method according to the invention, the auxiliary steam generation process can also be realized in a significantly less complex manner. In an embodiment, steam is extracted from the accumulator and fed to an auxiliary steam process of the power plant process to this end.

The steam can be generated by different methods in this case. In an embodiment, the partial flow of feed water in the heating process is first of all heated to just below the boiling point of the feed water, and delivered to, and evaporated in, the accumulator with expansion of the feed water. The margin between the temperature to which the feed water is heated and the boiling temperature is of sufficient magnitude in this case so that no flash evaporation occurs before entry into the accumulator. In this case, it is advantageous if the heated feed water is delivered to the accumulator by means of a pumping process. The pumping process in this case especially consists of a circulating pump and, if applicable, valves.

In an alternative embodiment, the partial flow of the feed water in the heating process is heated up to the boiling point or above the boiling point of the feed water, wherein with build-up of pressure steam is formed and the steam is delivered to the accumulator, utilizing the density difference between steam and feed water. An additional pump can be dispensed with in this case.

It is particularly advantageous if the partial flow of feed water is electrically heated in the heating device. As a result, an emissions-free steam generation can be realized.

The method for auxiliary steam generation is advantageously put into operation when the power plant is in transient operating states, during an outage, or during partial load operation or during starting up and shutting down operations, in order to supply the power plant process with sufficient auxiliary steam.

The power plant process in this case comprises a gas and steam turbine process with a water-steam cycle, wherein for auxiliary steam generation the method is integrated into the water-steam cycle of the gas and steam turbine process.

Alternatively, the power plant process is a CSP steam power plant process with a solar heated steam generation process, wherein the method for auxiliary steam generation is integrated into the water-steam cycle of the CSP steam power plant process.

BRIEF DESCRIPTION

Some of the embodiments will be described in detail, with reference to the following figures, wherein like designations denote like members, wherein.

DETAILED DESCRIPTION

Figure 1:
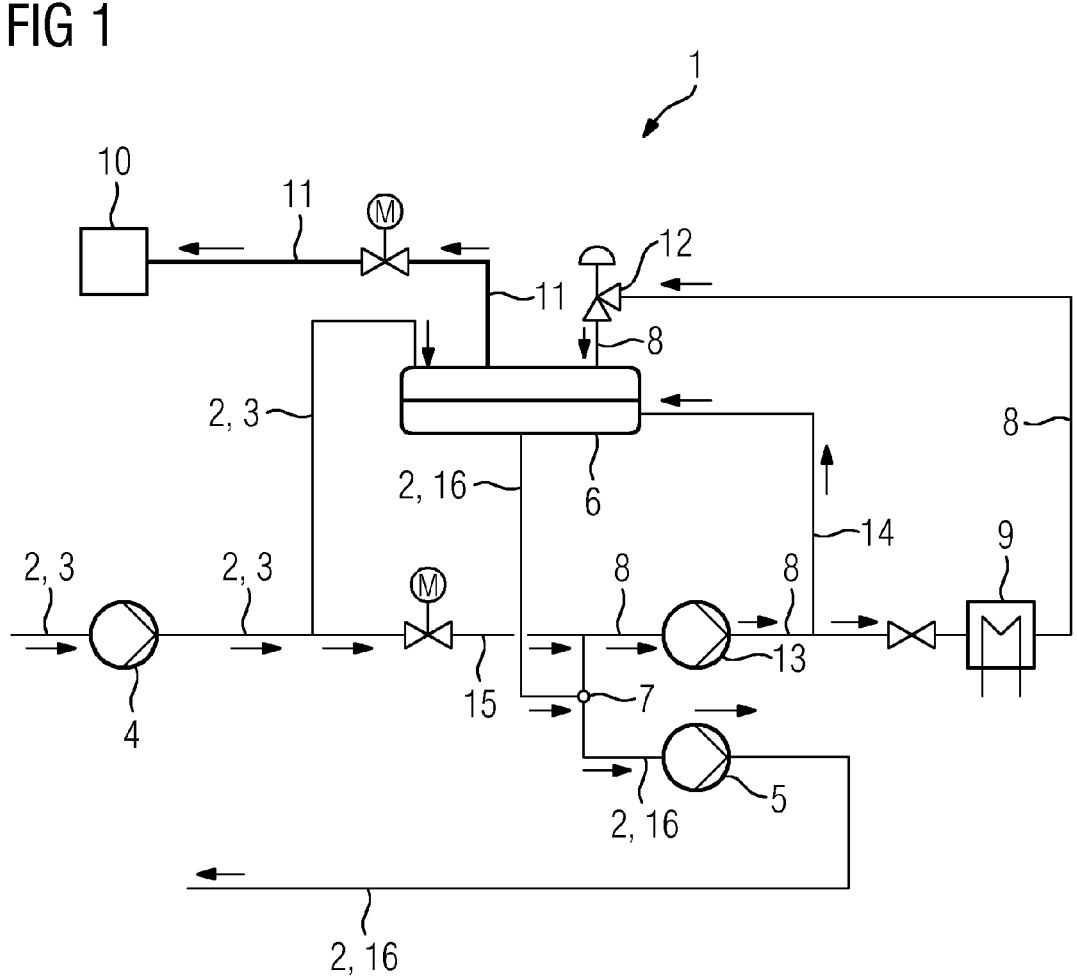
FIG. 1 shows an auxiliary steam generator system for a power plant.

Shown in FIG. 1 is an auxiliary steam generator system 1, as can be integrated into a fossil-fired power plant or a solar power plant. The power plant comprises a water-steam cycle 2, of which only the section of the condensate line 3 is shown here.

In essence, a condensate pump 4 and a pressure accumulating vessel 6 are connected into the condensate line 3, and a feed-water pump 5 is connected into the feed-water line 16. By means of the condensate pump 4, condensate is delivered to the pressure accumulating vessel 6. In the pressure accumulating vessel, the condensate is degassed, mixed and stored before it is pumped again by means of the feed-water pump 5 through the feed-water line 16 into the water-steam cycle 2.

In accordance with described embodiments, provision is now made for a feed-water extraction line 8 which is connected at a branch point 7 to the feed-water line 16 between the pressure accumulating vessel 6 and the feed-water pump 5. Not shown here is an alternative embodiment, in which the feed-water extraction line 8 is connected directly to the feed-water pump 5 or downstream of the said feed-water pump 5.

The feed-water extraction line 8 connects the feed-water line 16 to the pressure accumulating vessel 6. Connected into the feed-water extraction line 8 are basically a circulating pump 13 and a heating device 9. By means of the heating device 9, the extracted partial flow of feed water can be heated. Valves for controlling the partial flow are connected into the feed-water extraction line 8, moreover. Connected between the heating device 9 and the pressure accumulating vessel 6 is a pressure valve 12, by means of which the pressure in the pressure accumulating vessel can be adjustably maintained.

By means of the separate circulating pump 13, a quantity of feed water is extracted from the pressure accumulating vessel 6, brought up to pressure, heated in an electric heating device 9 with a sufficient margin in relation of the boiling point, and finally fed back into the pressure accumulating vessel via the pressure valve 12 or a regulating valve and then expanded. As a result of the expansion of the feed water—having been heated and at a higher pressure—to the pressure of the pressure accumulating vessel 6, a partial flash evaporation takes place.

Downstream of the circulating pump 13, a return line 14 is connected to the feed-water extraction line 8. By means of the circulating pump 13 and the minimum flow line of the circulating pump 14, a circuit is therefore created, by means of which a circulation of the feed water is enabled.

For the discharge of steam, a steam line 11 is connected to the pressure accumulating vessel 6. The steam line 11 connects the pressure accumulating vessel 6 to an auxiliary steam consumer 10. For the regulating or throttling of steam, a motor-powered or pneumatically operated control valve is connected into the steam line 11. The auxiliary steam consumer therefore obtains the necessary auxiliary steam exclusively from the pressure accumulating vessel 6.

The section of the condensate line 3 of the water-steam cycle 2, moreover, has a compensating line 15 which connects the section of the condensate line 3 between the condensate pump 4 and the pressure accumulating vessel 6 to the section of the feed-water extraction line 8 between the pressure accumulating vessel 6 and the circulating pump 13. A motor-powered or pneumatically operated control valve can be connected into the compensating line.

Figure 2:
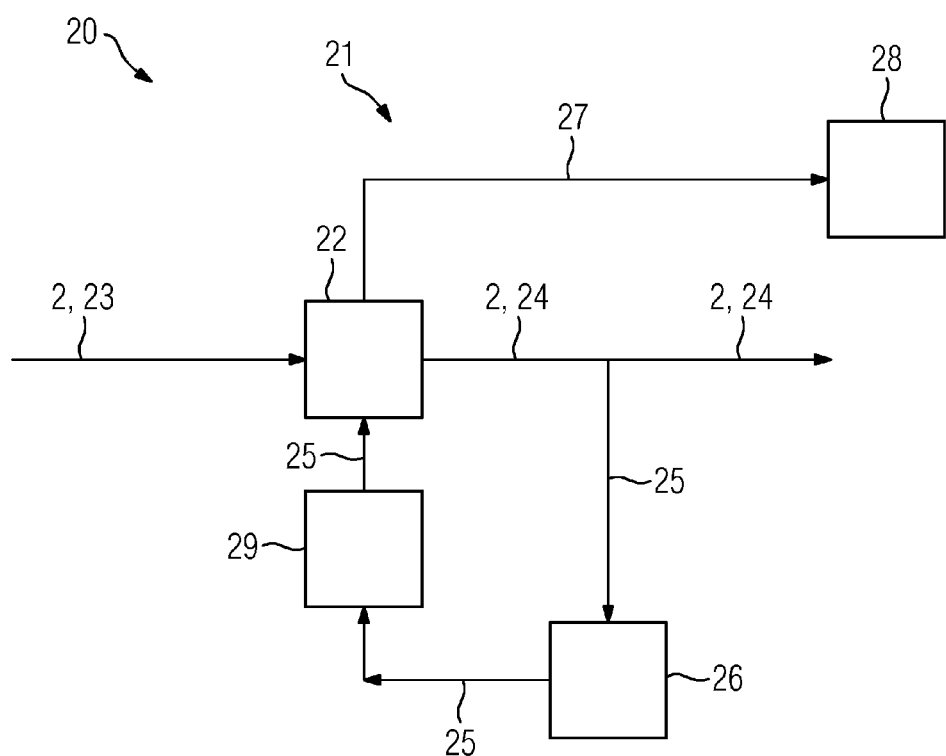
FIG. 2 shows a method for auxiliary steam generation for a power plant process.

FIG. 2 shows a method for auxiliary steam generation, as can be integrated into a fossil-fired power plant process or a solar power plant process. Shown here is a section of the water-steam cycle 2 for feed water 24 in the form of condensate 23 as results after the condensation in the power plant process.

The method basically comprises an accumulator 22 and a heating process 26. Condensate 23 from the water-steam cycle 2 is first of all fed to the accumulator 22. In the accumulator 22, the condensate 23 or feed water 24 is stored, mixed and degassed. Subsequently, it is discharged again and directed into the water-steam cycle 2 for evaporation.

A partial flow 25 is now extracted from the discharged feed water 24 and fed to the heating process 26. During the heating process, the feed water 24 is heated and fed back into the accumulator 22 again. The partial flow 25 of feed water is electrically heated during the heating process. For delivery of the partial flow 25 back into the accumulator 22, a pumping process 29 is provided.

By heating the feed water 24 during the heating process 26, steam 27 is generated in the accumulator 22 and can now be fed from the accumulator 22 to an auxiliary steam process.

By providing steam 27 from the accumulator 22, additional fossil-fired auxiliary steam generators can be dispensed with.

The invention claimed is:

1. An auxiliary steam generator system for a power plant, with a water-steam cycle, comprising a condensate line with one end connected to a pressure accumulating vessel, a compensating line and a feed-water line, wherein a condensate pump is connected into the condensate line and a feed-water pump is connected into the feed-water line, and wherein the pressure accumulating vessel is connected between the condensate pump and the feed-water pump, and wherein a feed-water extraction line is connected at a branch point to the water-steam cycle downstream of the pressure accumulating vessel, wherein the compensating line connects the condensate line into the feed-water extraction line and the feed-water extraction line is connected to the pressure accumulating vessel, and in that a heating device is connected into the feed-water extraction line.

2. The auxiliary steam generator system as claimed in claim 1, comprising a steam discharge line having a pressure control valve and, wherein the steam discharge line having a pressure control valve is connected to the pressure accumulating vessel.

3. The auxiliary steam generator system as claimed in claim 1 wherein a pressure maintaining valve is connected into the feed-water extraction line between the heating device and the pressure accumulating vessel, and by means of which steam pressure in the pressure accumulating vessel can be adjusted.

4. The auxiliary steam generator system as claimed in claim 1, wherein the feed-water extraction line is connected to the feed-water line of the water-steam cycle, and in that a circulating pump is connected into the feed-water extraction line upstream of the heating device.

5. The auxiliary steam generator system as claimed in claim 1, wherein the feed-water extraction line is connected to an extraction point of the feed-water pump.

6. The auxiliary steam generator system as claimed in claim 1, wherein the heating device is electric.

7. The auxiliary steam generator system as claimed in claim 1, wherein use in a gas and steam turbine power plant.

8. The auxiliary steam generator system as claimed in claim 1, wherein use in a CSP steam power plant with solar heated steam generation.

9. A method for auxiliary steam generation in a power plant process with an accumulator which is connected into a water-steam cycle and into which condensate from the water-steam cycle is delivered, and the condensate is stored, mixed and degassed in the accumulator, and the condensate is then discharged from the accumulator as feed water; and a partial flow of the discharged feed water is extracted, wherein the partial flow is electrically heated during a heating process, and the heated partial flow is fed back into the accumulator.

10. The method as claimed in claim 9, wherein steam is extracted from the accumulator.

11. The method as claimed in claim 9, wherein the partial flow of feed water is heated during the heating process below the boiling point of the feed water, and is delivered to, and evaporated in, the accumulator with expansion of the partial flow of feed water.

12. The method as claimed in claim 11, wherein the heated feed water is delivered to the accumulator by means of a pumping process.

13. The method as claimed in claim 9, wherein the partial flow of feed water is heated during the heating process up to boiling point, wherein with build-up of pressure steam is formed, and the steam is delivered to the accumulator, utilizing the density difference between steam and feed water.

14. The method as claimed in claim 9, wherein the method for auxiliary steam generation is put into operation when the power plant process is in transient operating states, during an outage, during starting up and shutting down or during partial load operation, in order to supply the power plant process with steam.

15. The method as claimed in claim 9, wherein the power plant process comprises a gas and steam turbine process with a water-steam cycle, wherein the method for auxiliary steam generation is integrated into the water-steam cycle of the gas and steam turbine process.

16. The method as claimed in claim 9, wherein the power plant process is a CSP steam power plant process with a solar heated steam generation process, wherein the method for auxiliary steam generation is integrated into the water-steam cycle of the CSP steam power plant process.

* * * * *